US011440271B2

(12) United States Patent
Ikezaki et al.

(10) Patent No.: US 11,440,271 B2
(45) Date of Patent: Sep. 13, 2022

(54) FILAMENT WINDING DEVICE

(71) Applicant: Murata Machinery, Ltd., Kyoto (JP)

(72) Inventors: Shu Ikezaki, Kyoto (JP); Motohiro Tanigawa, Kyoto (JP); Tadashi Uozumi, Kyoto (JP); Hirotaka Wada, Kyoto (JP); Masatsugu Goyude, Kyoto (JP); Tetsuya Matsuura, Kyoto (JP); Daigoro Nakamura, Kyoto (JP); Takahiro Miura, Kyoto (JP); Makoto Tanaka, Kyoto (JP); Shota Miyaji, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 77 days.

(21) Appl. No.: 17/271,502

(22) PCT Filed: Jul. 10, 2019

(86) PCT No.: PCT/JP2019/027405
§ 371 (c)(1),
(2) Date: Feb. 25, 2021

(87) PCT Pub. No.: WO2020/044806
PCT Pub. Date: Mar. 5, 2020

(65) Prior Publication Data
US 2021/0197501 A1    Jul. 1, 2021

(30) Foreign Application Priority Data

Aug. 31, 2018    (JP) ............................. JP2018-163398

(51) Int. Cl.
*B29C 70/32*    (2006.01)
*B29C 53/58*    (2006.01)
(Continued)

(52) U.S. Cl.
CPC ............ *B29C 70/32* (2013.01); *B29C 53/582* (2013.01); *B29C 70/16* (2013.01); *B29C 70/54* (2013.01)

(58) Field of Classification Search
None
See application file for complete search history.

(56) References Cited

U.S. PATENT DOCUMENTS

2008/0197229 A1*  8/2008  Uozumi .................. B29C 53/66
                                                                 242/478.2
2009/0127373 A1   5/2009  Uozumi et al.
(Continued)

FOREIGN PATENT DOCUMENTS

JP    2009-119732 A    6/2009
JP    2010-36461 A     2/2010
(Continued)

*Primary Examiner* — Jeffry H Aftergut
(74) *Attorney, Agent, or Firm* — DLA Piper LLP (US)

(57) ABSTRACT

A helical winding unit is provided with a frame member in which a plurality of nozzle attachment units are provided to be aligned in a circumferential direction about an axis of a liner; nozzle units that each have a guide body movable in a radial direction of the liner and rotatable about a rotating axis extending in the radial direction, and that are attachable to and detachable from the nozzle attachment units; a moving endless toothed annular body that transmits, commonly to one or more nozzle units attached to one or more nozzle attachment units, power for moving the guide body in the radial direction; and a rotating endless toothed annular body that transmits, commonly to one or more nozzle units attached to one or more nozzle attachment units, power for rotating the guide body about the rotating axis.

15 Claims, 9 Drawing Sheets

(51) Int. Cl.
*B29C 70/16* (2006.01)
*B29C 70/54* (2006.01)

(56) References Cited

U.S. PATENT DOCUMENTS

| | | | |
|---|---|---|---|
| 2010/0032510 A1 | 2/2010 | Tanigawa et al. | |
| 2013/0186996 A1* | 7/2013 | Tanigawa | B29C 53/8016 |
| | | | 242/444 |
| 2013/0200199 A1* | 8/2013 | Tanigawa | B65H 54/28 |
| | | | 242/476.7 |
| 2013/0306783 A1 | 11/2013 | Tanigawa et al. | |

FOREIGN PATENT DOCUMENTS

| | | |
|---|---|---|
| JP | 2011-115983 A | 6/2011 |
| JP | 5643322 B2 | 12/2014 |
| WO | 2012/043342 A1 | 4/2012 |
| WO | 2012/043345 A1 | 4/2012 |

* cited by examiner

CIRCUMFERENTIAL DIRECTION

CIRCUMFERENTIAL DIRECTION

CIRCUMFERENTIAL DIRECTION

FILAMENT WINDING DEVICE

TECHNICAL FIELD

This disclosure relates to a filament winding device including a helical winding unit configured to helical-wind fiber bundles onto a liner.

BACKGROUND

A filament winding device recited in, e.g., Japanese Patent No. 5643322 includes a helical winding unit (helical head in Japanese Patent No. 5643322) configured to helical-wind fiber bundles onto a liner. In the helical winding unit, fiber supply guides configured to guide the fiber bundles to the liner are provided in a circumferential direction centered at the axis of the liner. Each fiber supply guide is configured to be movable in a radial direction of the liner and to be rotatable about a rotational axis extending in the radial direction of the liner. By properly controlling the operation of each fiber supply guide, the fiber bundles taken out from the fiber supply guides are simultaneously helical-wound onto the liner.

As one of the parameters showing a winding state of fiber bundles, there is a cover rate. In a single winding layer, when the adjacent fiber bundles do not overlap each other and are wound without gaps, the cover rate is 100%. When there are gaps between the adjacent fiber bundles, the cover rate is less than 100%. When the adjacent fiber bundles overlap each other, the cover rate is more than 100%. Typically, the winding is performed so that the cover rate in each winding layer is 100%.

The number of fiber bundles required for arranging a cover rate to be 100% at the time of helical winding varies depending on the area of a circumferential surface of a liner, i.e., the diameter of the liner. For example, the number of fiber bundles required to achieve a 100% cover rate with the diameter of one liner is referred to as N. By winding N fiber bundles onto a liner which is larger in diameter than the above-described liner, gaps are formed between the adjacent fiber bundles. As a result, the cover rate is less than 100%. Meanwhile, by winding N fiber bundles onto a liner that is smaller in diameter than the above-described liner, some fiber bundles overlap each other. As a result, the cover rate is more than 100%. That is, to achieve a desired cover rate, the number of the wound fiber bundles needs to be changed in accordance with the diameter of the liner. However, in a helical winding unit in Japanese Patent No. 5643322, the number of fiber supply guides is fixed so that the number of the supplied fiber bundles is not changed. Therefore, it was impossible to deal with a change of the diameter of the liner.

Meanwhile, a so-called single-yarn-supply-type filament winding device, i.e., a filament winding device that repeatedly winds one fiber bundle or a few fiber bundles has been known. In the single-yarn-supply-type filament winding device, because the degree of freedom in a winding state is high, a desired cover rate is achieved even when the diameter of the liner varies. However, because only one fiber bundle or a few fiber bundles is/are wound, winding efficiency is significantly deteriorated.

It could therefore be helpful to provide a filament winding device that is able to easily deal with a change in diameter of a liner and in which winding efficiency is high.

SUMMARY

We thus provide a filament winding device comprising a helical winding unit configured to helical-wind at least one fiber bundle onto a liner, the helical winding unit including: a frame member in which nozzle mounts are provided to be aligned in a circumferential direction centered at an axis of the liner; at least one nozzle unit that includes a guide body and is attachable to and detachable from at least one of the nozzle mounts, the guide body being movable in a radial direction of the liner, rotatable about a rotational axis extending in the radial direction, and capable of guiding a plurality of fiber bundles to the liner; an endless toothed annular body for moving that is formed to be annular in shape along the circumferential direction and is configured to transmit power to all of the at least one nozzle unit attached to the at least one of the nozzle mounts, the power being provided for moving the guide body in the radial direction; and an endless toothed annular body for rotating that is annular in shape along the circumferential direction and configured to transmit power to all of the at least one nozzle unit attached to the at least one of the nozzle mounts, the power being provided to rotate the guide body about the rotational axis.

Because the nozzle mounts to and from which the nozzle units are attachable and detachable are provided in the frame member, the number of the nozzle units is suitably changed. In addition, each nozzle unit is configured to be supplied with power via the endless toothed annular body for moving and the endless toothed annular body for rotating that are shared by the nozzle units. Because of this, when the number of the nozzle units is changed, i.e., when the nozzle units are attached to or detached from the nozzle mounts, it is unnecessary to attach or detach a power supply mechanism. Therefore, the number of the nozzle units is easily changed, and thus the number of the supplied fiber bundles is easily changed. It is therefore possible to easily deal with changes in diameter of a liner. The guide body of each nozzle unit is configured to guide the fiber bundles to the liner. Because of this, the fiber bundles are simultaneously wound onto the liner, and thus the winding efficiency is increased.

Our winding devices may be arranged such that the nozzle mounts include at least first nozzle mounts that are regularly provided at first angle intervals in the circumferential direction and at least second nozzle mounts that are regularly provided at second angle intervals in the circumferential direction, the second angle being larger than the first angle and not a multiple of the first angle.

With this arrangement, the nozzle units can be provided at regular intervals at least such as at first angle intervals and at second angle intervals. Therefore, when the nozzle units are provided at regular intervals, the degree of freedom in adjusting the number of the nozzle units is increased. As a result, it is possible to correspond to various outer diameters of the liner.

Our winding devices may be arranged such that the first nozzle mounts are provided at 40 degree intervals in the circumferential direction, and the second nozzle mounts are provided at larger degree intervals than the 40 degree intervals in the circumferential direction.

With this arrangement, nine (=360/40) nozzle units can be provided at regular intervals, and eight or less nozzle units can also be provided at regular intervals. Furthermore, three, which is a divisor of nine, nozzle units can be provided at regular intervals. Therefore, the degree of freedom in adjusting the number of the nozzle units is high, and thus it is possible to correspond to various outer diameters of the liner.

Our winding devices may be arranged such that the endless toothed annular body for moving and the endless toothed annular body for rotating are ring gears.

The ring gears are high in rigidity. Therefore, even if some nozzle units that mesh with the ring gears are detached, the shapes of the ring gears are maintained to be substantially constant. Therefore, the transmission of power to the nozzle units is stably performed.

Our winding devices may be arranged such that the endless toothed annular body for moving and the endless toothed annular body for rotating are endless belts, and the endless belts are wound onto pulleys each of which is able to transmit power from the endless belts to the at least one nozzle unit.

By using the endless belts, the endless belts are easily replaced even when the endless belts are worn.

Our winding devices may be arranged such that a through hole is formed in the frame member to penetrate the frame member in an axial direction of the liner, a part of the at least one nozzle unit attached to one side, in the axial direction, of the frame member passes through the through hole and reaches the other side of the frame member so that the at least one nozzle unit is able to receive power from one of the endless toothed annular body for moving and the endless toothed annular body for rotating which is provided on the other side of the frame member, and the through hole is a slot formed across two or more of the nozzle mounts along the circumferential direction.

With this arrangement, even when a part of the nozzle unit inserted into the slot (through hole) is not pulled out from the slot, the nozzle unit is moved in the circumferential direction such that this part is moved in the slot. Therefore, the mount position of each nozzle unit is easily changed.

Our winding devices may be arranged such that a guide portion configured to guide the at least one nozzle unit along the circumferential direction is provided in the frame member.

By providing the guide portion configured as such, the nozzle units are smoothly moved in the circumferential direction. Therefore, the mount positions of the nozzle units are further easily changed.

REFERENCE SIGNS LIST

Figure 1:
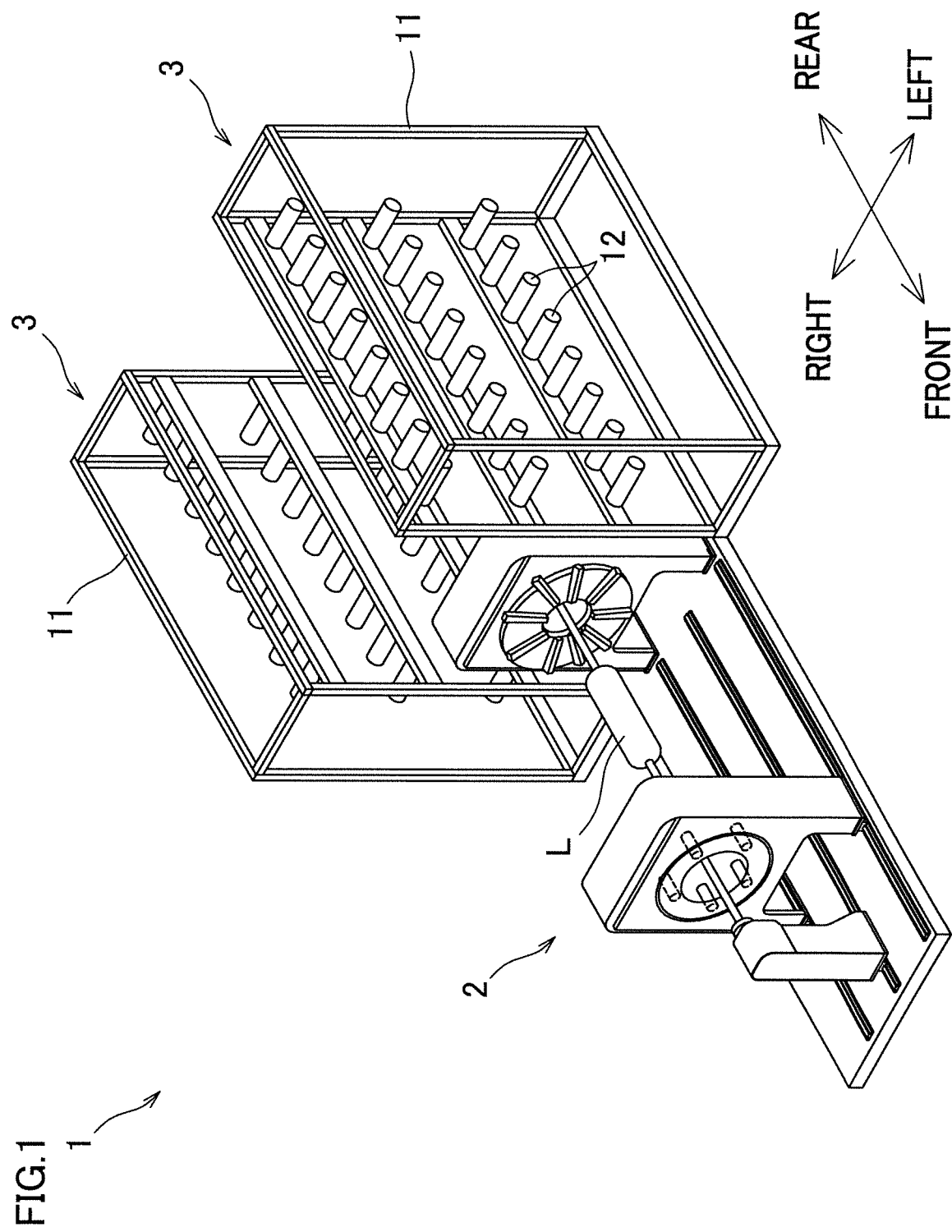
FIG. 1 is a perspective view showing an example of a filament winding device.

1 filament winding device
50 helical winding unit
52 frame member
52a through hole (slot)
53 nozzle unit
58 ring gear for moving (endless toothed annular body for moving)
59 ring gear for rotating (endless toothed annular body for rotating)
65 guide body
100 nozzle mount
100A nozzle mount (first nozzle mount)
100B nozzle mount (second nozzle mount)
101 guide portion
110 endless belt (endless toothed annular body)
111 driven pulley (pulley)
L liner
F fiber bundle
A rotational axis

DETAILED DESCRIPTION

Filament Winding Device

The following will describe a representative example of a filament winding device with reference to the figures. FIG. 1 is a perspective view showing an example of a filament winding device. For convenience of explanation, directions shown in FIG. 1 will be consistently used. A filament winding device 1 includes a winder 2 and a pair of creel stands 3 provided on the left and right sides of a rear portion of the winder 2, and is arranged to be substantially symmetrical in the left-right direction on the whole. In FIG. 1, to avoid complexity in the figure, a part of the winder 2 sandwiched by the paired left and right creel stands 3 is not illustrated.

The winder 2 is configured to wind fiber bundles (not illustrated in FIG. 1) onto a liner L that is substantially cylindrical in shape. Each fiber bundle is formed by, for example, impregnating a thermosetting or thermoplastic synthetic resin material into a fiber material such as carbon fiber. For example, when a pressure vessel such as a pressure tank is produced in the winder 2, the liner L having dome-shaped small diameter portions at both ends of a cylindrical large diameter portion as shown in FIG. 1 is used. The liner L is made of a material such as high-strength aluminum, metal, and resin. After the fiber bundles are wound onto the liner L, a thermosetting process such as baking or a cooling process is performed. As a result, an end product of a high-strength pressure vessel or the like is produced.

The creel stand 3 is structured so that bobbins 12 onto which the fiber bundles are wound are rotatably supported by a supporting frame 11 provided beside the winder 2. Each fiber bundle supplied from each bobbin 12 of the creel stand 3 is used by a later-described helical winding unit to perform helical winding.

Winder

Figure 2:
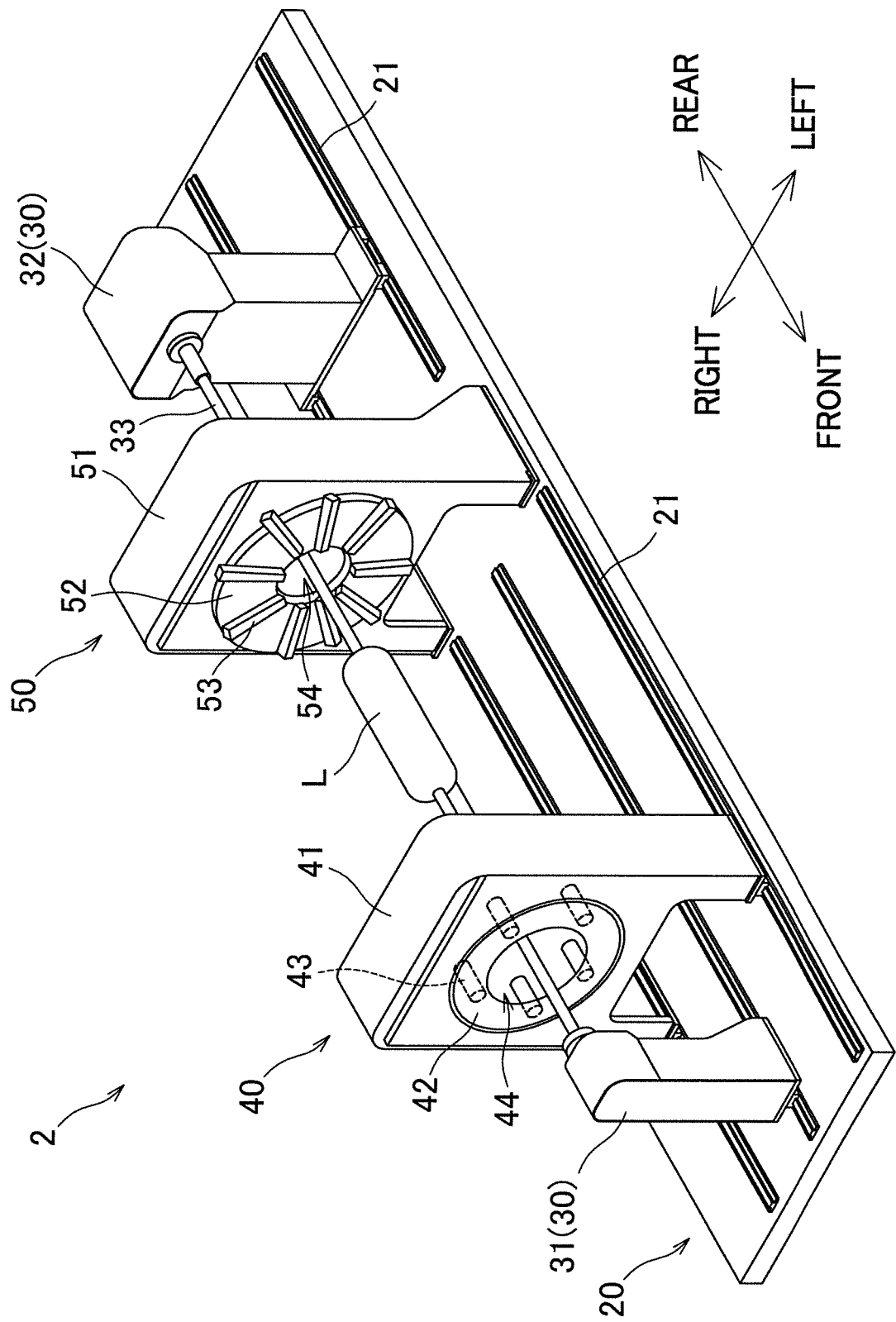
FIG. 2 is a perspective view showing a winder.
Figure 3:
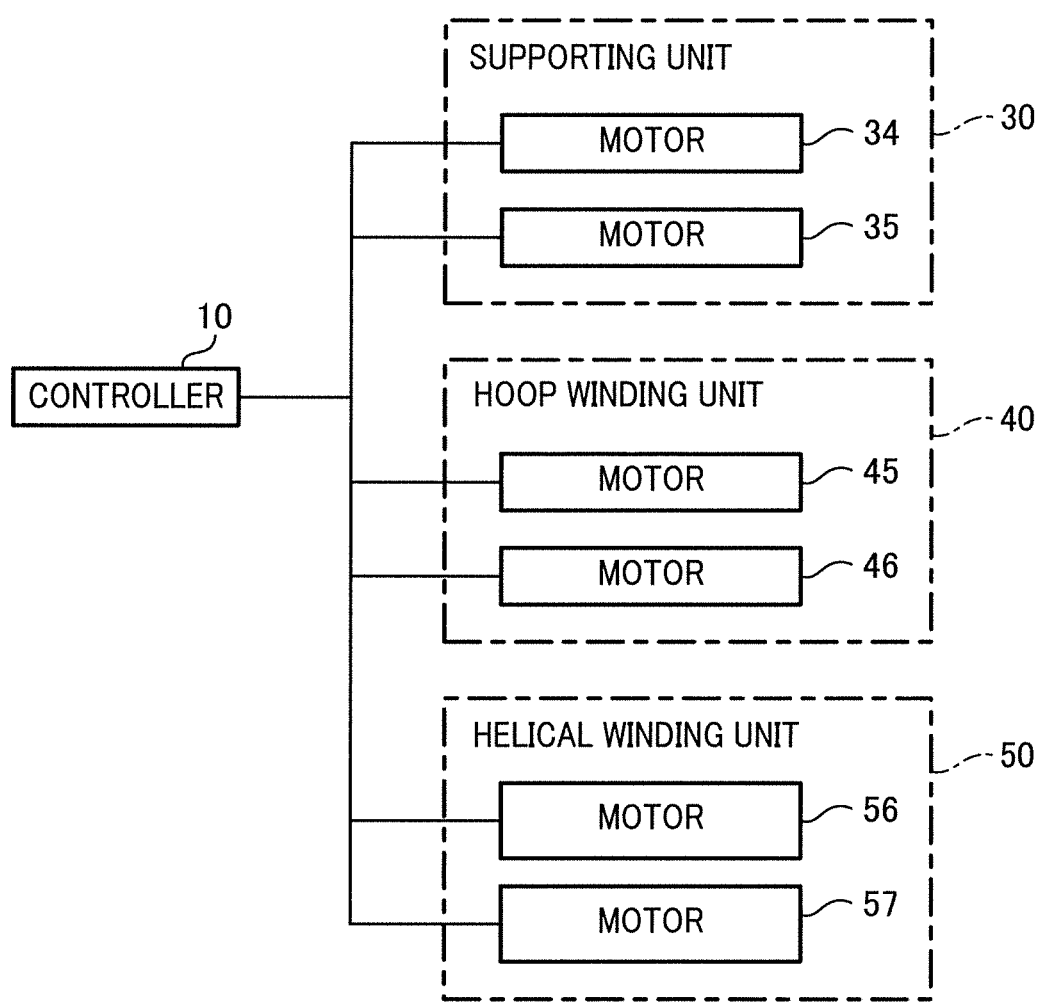
FIG. 3 is a block diagram showing an electric structure of the winder.

The winder 2 will be detailed. FIG. 2 is a perspective view showing the winder 2. FIG. 3 is a block diagram showing an electric structure of the winder 2. As shown in FIG. 2, the winder 2 includes a base 20, supporting units 30 (first supporting unit 31 and second supporting unit 32), a hoop winding unit 40, and a helical winding unit 50.

The base 20 supports the supporting units 30, the hoop winding unit 40, and the helical winding unit 50. On the top surface of the base 20, rails 21 are provided to extend in the front-rear direction. The supporting units 30 and the hoop winding unit 40 are provided on the rails 21, and are capable of reciprocating in the front-rear direction on the rails 21. Meanwhile, the helical winding unit 50 is fixed to the base 20. A first supporting unit 31, the hoop winding unit 40, the helical winding unit 50, and a second supporting unit 32 are provided in this order from the front-side to the rear-side.

The supporting units 30 include the first supporting unit 31 which is placed in front of the hoop winding unit 40, and the second supporting unit 32 which is placed behind the helical winding unit 50. Through a supporting shaft 33 extending in an axial direction of the liner L (i.e., in the front-rear direction), the supporting units 30 support the liner L so that the liner L is rotatable about the shaft. The supporting units 30 include a motor 34 and a motor 35 as shown in FIG. 3. The motor 34 moves the first supporting unit 31 and the second supporting unit 32 in the front-rear direction along the rails 21. The motor 35 rotates the supporting shaft 33 so that the liner L is rotated about the shaft. The motor 34 and the motor 35 are driven and controlled by a controller 10.

The hoop winding unit 40 is configured to perform hoop-winding onto the circumferential surface of the liner L. The hoop winding is a way of winding the fiber bundles onto the liner L in a direction substantially orthogonal to the axial direction of the liner L. The hoop winding unit 40 includes a main body 41, a rotating member 42, and bobbins 43. The main body 41 is provided on the rails 21, and supports the disc-shaped rotating member 42 such that the rotating member 42 is rotatable about the axis of the liner L. At a central portion of the rotating member 42, a circular passing hole 44 is formed to allow the liner L to pass therethrough. The rotating member 42 rotatably supports the bobbins 43 that are circumferentially provided at regular intervals around the passing hole 44. The fiber bundles are respectively wound to the bobbins 43.

The hoop winding unit 40 includes a motor 45 and a motor 46 as shown in FIG. 3. The motor 45 moves the main body 41 in the front-rear direction along the rails 21. The motor 46 rotates the rotating member 42 about the axis of the liner L. The motor 45 and the motor 46 are driven and controlled by the controller 10. When the hoop winding is performed, the controller 10 rotates the rotating member 42 while causing the main body 41 to reciprocate along the rails 21. Because of this, the fiber bundles are taken out from the respective bobbins 43 rotating around the liner L, and simultaneously hoop-wound onto the circumferential surface of the liner L.

The helical winding unit 50 is configured to perform helical-winding onto the circumferential surface of the liner L. The helical winding is a way of winding the fiber bundles onto the liner L in a direction substantially parallel to the axial direction of the liner L. The helical winding unit 50 includes a main body 51, a frame member 52, and plural (nine in this example) nozzle units 53. The main body 51 is fixed to the base 20. The frame member 52 is a disc-shaped member attached to the main body 51. At a central part of the frame member 52, a circular passing hole 54 is formed to allow the liner L to pass therethrough. The nozzle units 53 are aligned in a circumferential direction centered at the axis of the liner L, and radially provided on the whole. Each nozzle unit 53 is fixed to the frame member 52.

Figure 4A:
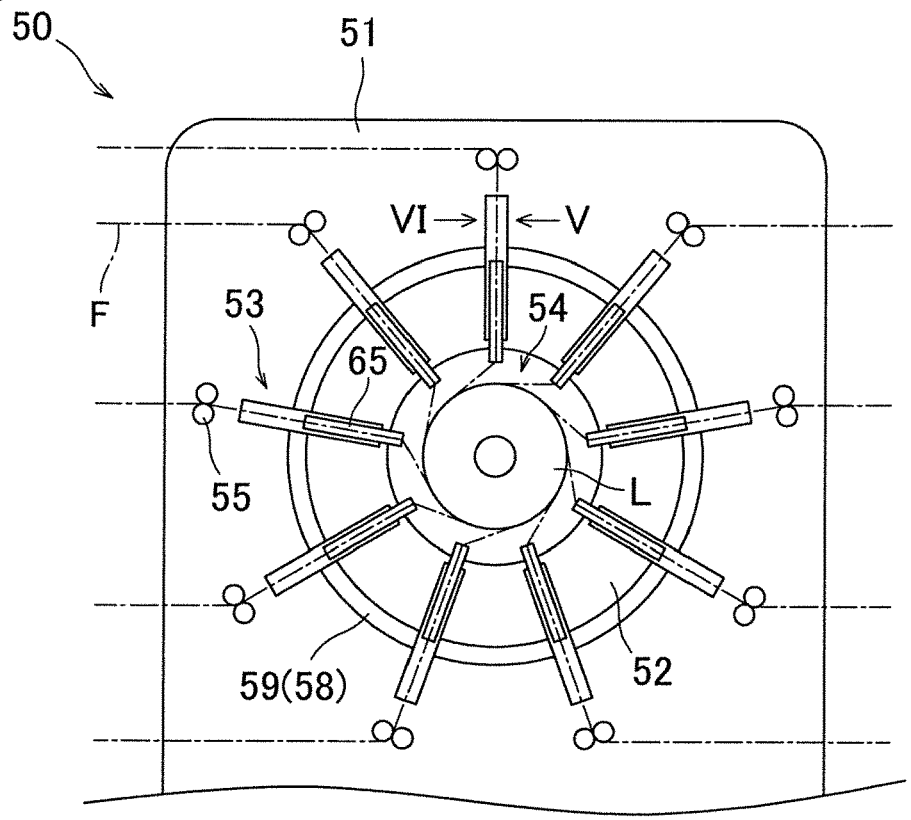
FIGS. 4A and 4B are front views of a helical winding unit.
Figure 4B:
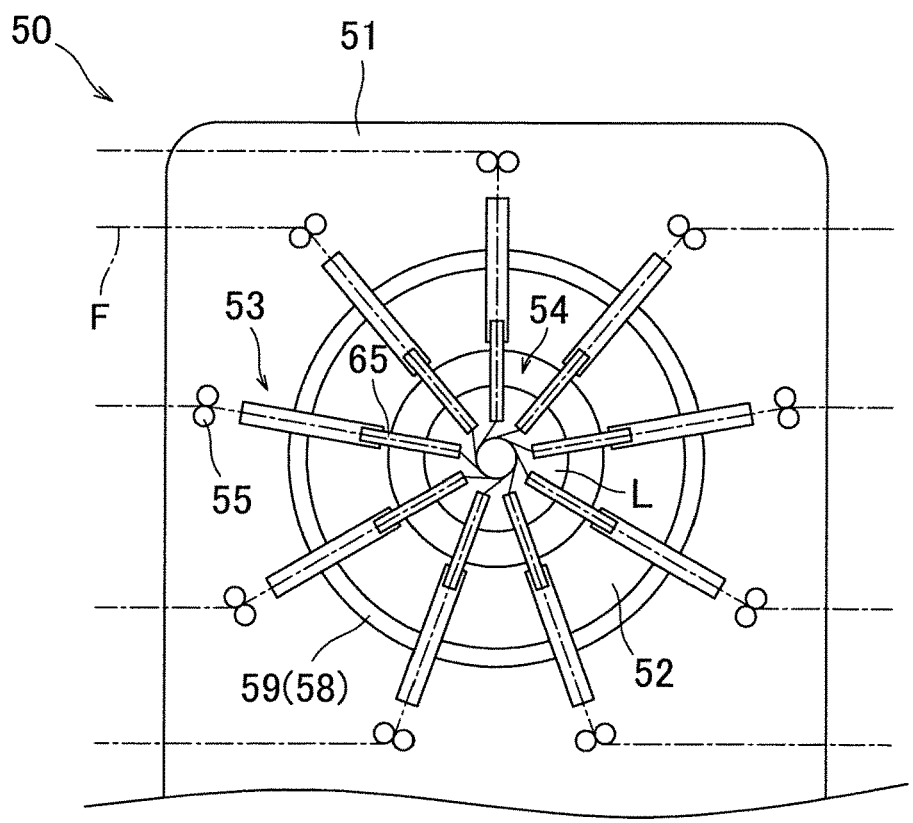

FIGS. 4A and 4B are front views of the helical winding unit 50. As shown in FIGS. 4A and 4B, each nozzle unit 53 includes a guide body 65 guiding fiber bundles F to the liner L. The guide body 65 extends in a radial direction of the liner L (hereinafter, the radial direction), and is configured to be movable in the radial direction and rotatable about a rotational axis extending in the radial direction. Radially outside the nozzle unit 53, a guide roller 55 is provided. The fiber bundle F taken out from each bobbin 12 of the creel stand 3 passes through the guide body 65 via the guide roller 55, and then reaches the liner L.

The helical winding unit 50 includes a motor 56 and a motor 57 as shown in FIG. 3. The motor 56 moves the guide body 65 in the radial direction. The motor 57 rotates the guide body 65 about the rotational axis. The motor 56 and the motor 57 are driven and controlled by the controller 10. When the helical winding is performed, the controller 10 drives and controls the supporting units 30 so that the liner L passes through the passing hole 54 while being slowly rotated about the shaft. At the same time, the controller 10 suitably moves the guide body 65 of each nozzle unit 53 in the radial direction while rotating the guide body 65 of each nozzle unit 53 about the rotational axis. Because of this, the fiber bundles F are taken out from the guide body 65 of each nozzle unit 53, and the fiber bundles F are simultaneously helical-wound onto the circumferential surface of the liner L.

Control of the movement of the guide body 65 in the radial direction is performed to position a leading end portion of the guide body 65 at a position close to the circumferential surface of the liner L. FIG. 4A shows a state in which the fiber bundles F are wound onto the large diameter portion of the liner L. FIG. 4B shows a state in which the fiber bundles F are wound onto each small diameter portion of the liner L. As such, when the fiber bundles F are wound onto the small diameter portion of the liner L, each guide body 65 is moved radially inward compared to when the fiber bundles F are wound onto the large diameter portion of the liner L. In addition, when the winding direction of the fiber bundles F with respect to the liner L changes, the control of the rotation of the guide body 65 about the rotational axis is performed to suitably take out the fiber bundles F.

Nozzle Unit

Figure 5:
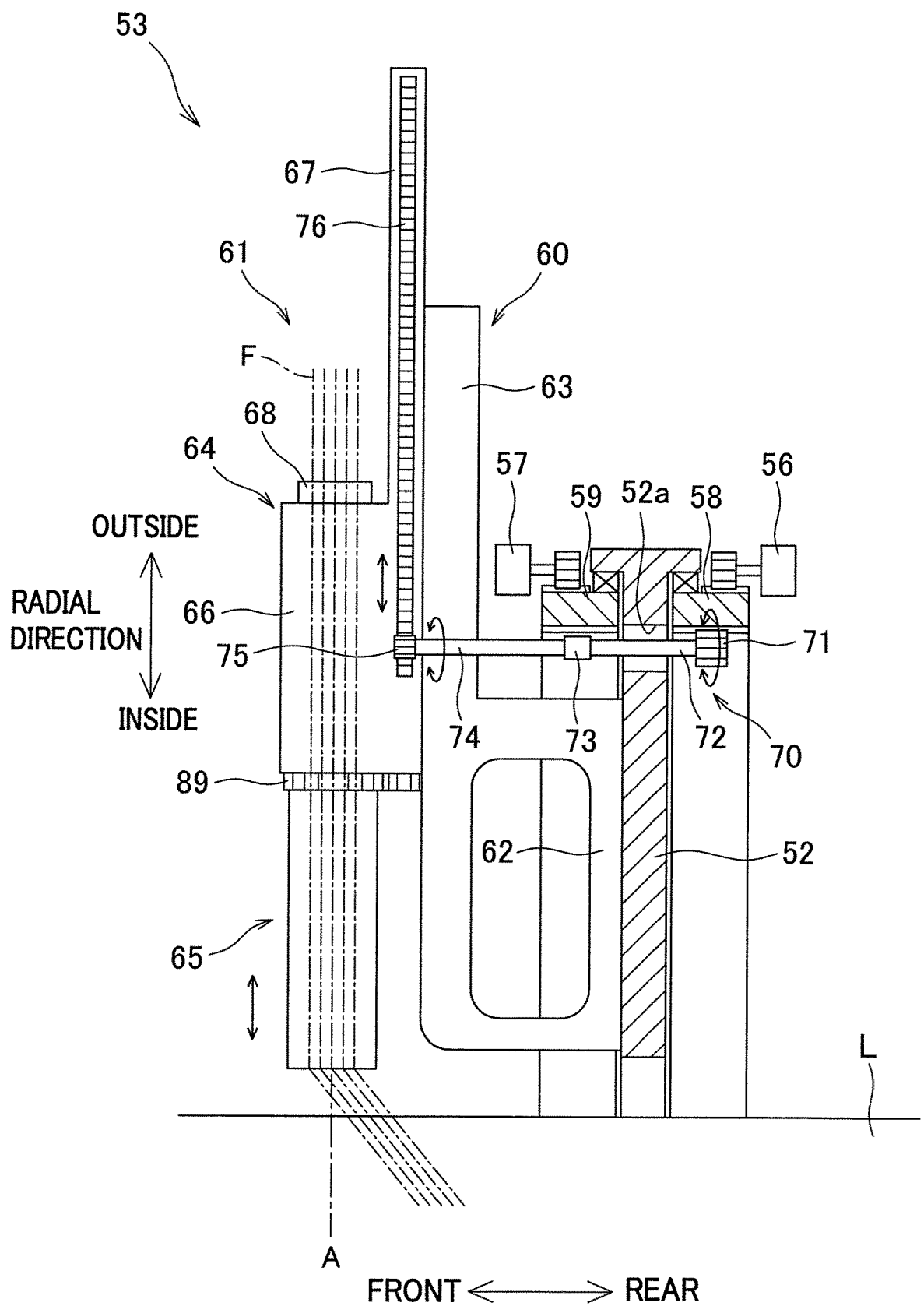
FIG. 5 is a side-view of each nozzle unit when viewed from a direction V in FIG. 4A.
Figure 6:
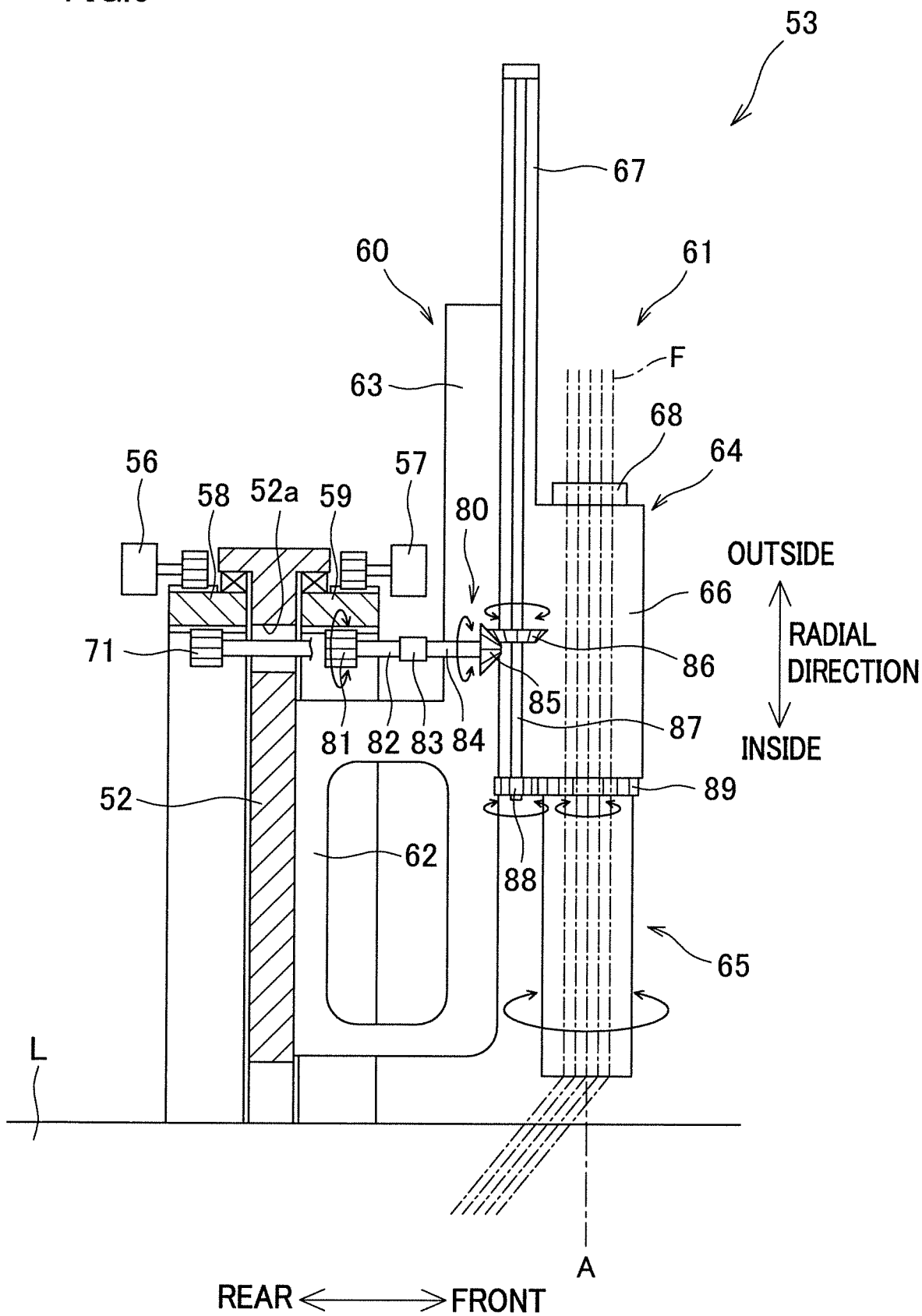
FIG. 6 is a side-view of each nozzle unit when viewed from a direction VI in FIG. 4A.

The nozzle units 53 will be detailed. FIG. 5 is a side-view of each nozzle unit 53 when viewed from a direction V in FIG. 4A. FIG. 6 is a side-view of each nozzle unit 53 when viewed from a direction VI in FIG. 4A. FIGS. 5 and 6 show a state in which each guide body 65 is positioned on the outermost side in the radial direction.

The nozzle unit 53 is attached to the front surface of the frame member 52 by an unillustrated bolt, and configured to be detachable from the frame member 52. The nozzle unit 53 includes a supporter 60 that is fixed to the frame member 52 and a moving body 61 that is supported by the supporter 60 to be movable in the radial direction.

The supporter 60 includes a fixed portion 62 and a supporting portion 63. The fixed portion 62 is fixed to the frame member 52. The supporting portion 63 extends in the radial direction. In the supporting portion 63, an unillustrated rail is provided to extend in the radial direction. The moving body 61 is engaged with this rail so that the supporting portion 63 supports the moving body 61 to be movable in the radial direction. The supporting portion 63 is provided outside an end face of a ring gear 58 for moving and provided outside an end face of a ring gear 59 for rotating.

The moving body 61 includes a main body 64 and the guide body 65. The main body 64 is structured so that a cylindrical portion 66 and a supported portion 67 are integrally formed. The cylindrical portion 66 is formed to be a cylindrical shape extending in the radial direction. The supported portion 67 extends in the radial direction to protrude radially outward from the cylindrical portion 66, and is engaged with the rail provided in the supporting portion 63.

The guide body 65 extends in the radial direction, and is configured to guide the fiber bundles F to the liner L. An upstream part of the guide body 65 in a running direction of the fiber bundles F (hereinafter, the running direction) is rotatably supported by an unillustrated bearing provided inside the cylindrical portion 66. Because of this, the guide body 65 is rotatable about a rotational axis A extending in the radial direction. At a upstream end portion of the guide body 65 in the running direction, a fiber bundle introducing guide 68 is provided to introduce the fiber bundles F into the guide body 65. The fiber bundles F introduced into the guide body 65 via the fiber bundle introducing guide 68 are taken out from a downstream end portion (hereinafter, the leading end portion) of the guide body 65 in the running direction, and then wound onto the circumferential surface of the liner L.

Movement Mechanism of Nozzle Unit

The following will describe driving mechanisms of the nozzle unit 53, i.e., a movement mechanism 70 as shown in FIG. 5 that moves the moving body 61 in the radial direction and a rotation mechanism 80 as shown in FIG. 6 that rotates the guide body 65 about the rotational axis A.

To begin, the movement mechanism 70 will be described. As shown in FIG. 5, the movement mechanism 70 receives power from the ring gear 58 provided behind the frame member 52. The ring gear 58 is formed to be annular in shape along the circumferential direction centered at the axis of the liner L, and supported to be rotatable in the circumferential direction of the liner L by the frame member 52 via a bush made of resin.

The movement mechanism 70 includes a driven gear 71, a drive shaft 72, a coupling 73, a transmission shaft 74, a pinion gear 75, and a rack gear 76 in this order from an upstream side in a power transmission direction. The driven gear 71, the drive shaft 72, the coupling 73, the transmission shaft 74, and the pinion gear 75 are attached to the supporter 60. Meanwhile, the rack gear 76 is attached to the moving body 61.

The driven gear 71 is fixed to a rear end portion of the drive shaft 72, and meshes with a gear portion formed on the inner circumferential surface of the ring gear 58. The pinion gear 75 is fixed to a front end portion of the transmission shaft 74, and meshes with the rack gear 76. The drive shaft 72 and the transmission shaft 74 are coupled by the coupling 73, and the driven gear 71 and the pinion gear 75 rotate together. In this regard, the coupling 73 may be omitted and the drive shaft 72 and the transmission shaft 74 may be integrally formed of one shaft. The rack gear 76 is fixed to the supported portion 67 of the moving body 61, and extends in the radial direction.

As indicated by arrows in FIG. 5, when the motor 56 rotates the ring gear 58, the driven gear 71 is rotated to rotate the pinion gear 75. Subsequently, by a rack-and-pinion mechanism formed of the pinion gear 75 and the rack gear 76, the rotating motion of the pinion gear 75 is converted into moving motion of the moving body 61 in the radial direction. As such, by the movement mechanism 70, the moving body 61 is moved in the radial direction.

All of the driven gears 71 of the nozzle units 53 mesh with the ring gear 58. Because of this, as the ring gear 58 is rotated, power is transmitted to all nozzle units 53 from the ring gear 58 at once. As a result, the moving bodies 61 of the nozzle units 53 are simultaneously moved in the radial direction. In the frame member 52, a through hole 52a is formed to penetrate therethrough in the axial direction of the liner L. Therefore, when the nozzle unit 53 is attached, the driven gear 71 meshes with the ring gear 58 such that the driven gear 71 penetrates the through hole 52a from the front-side to the rear-side.

Rotation Mechanism of Nozzle Unit

The rotation mechanism 80 will be described. As shown in FIG. 6, the rotation mechanism 80 receives power from the ring gear 59 provided in front of the frame member 52. The ring gear 59 is formed to be annular in shape along the circumferential direction centered at the axis of the liner L, and supported to be rotatable in the circumferential direction of the liner L by the frame member 52 via a bush made of resin. The diameter of the ring gear 58 and the diameter of the ring gear 59 are identical with each other.

The rotation mechanism 80 includes a driven gear 81, a drive shaft 82, a coupling 83, a transmission shaft 84, a first bevel gear 85, a second bevel gear 86, a guide shaft 87, an intermediate gear 88, and a gear 89 in this order from an upstream side in a power transmission direction. The driven gear 81, the drive shaft 82, the coupling 83, the transmission shaft 84, the first bevel gear 85, and the second bevel gear 86 are attached to the supporter 60. Meanwhile, the guide shaft 87, the intermediate gear 88, and the gear 89 are attached to the moving body 61.

The driven gear 81 is fixed to a rear end portion of the drive shaft 82, and meshes with a gear portion formed on the inner circumferential surface of the ring gear 59. The first bevel gear 85 is fixed to a front end portion of the transmission shaft 84, and meshes with the second bevel gear 86. The drive shaft 82 and the transmission shaft 84 are coupled by the coupling 83, and the driven gear 81 and the first bevel gear 85 rotate together. In this regard, the coupling 83 may be omitted and the drive shaft 82 and the transmission shaft 84 may be integrally formed of one shaft. The guide shaft 87 is formed of a member such as a spline shaft and a square pillar that extend in the radial direction, and arranged to be able to transmit torque. The guide shaft 87 is attached to the supported portion 67 of the moving body 61 to be rotatable about the axis of the guide shaft 87. The guide shaft 87 is inserted into a through hole formed at a central portion of the second bevel gear 86. The guide shaft 87 inserted into this through hole rotates together with the second bevel gear 86, but is movable relative to the second bevel gear 86 in the radial direction. The intermediate gear 88 is fixed to an inner end portion of the guide shaft 87 in the radial direction. The gear 89 fixed to the guide body 65 meshes with the intermediate gear 88. The gear 89 is a gear coaxial with the rotational axis A of the guide body 65, and the number of teeth of the gear 89 is large compared to the intermediate gear 88.

As indicated by arrows in FIG. 6, when the motor 57 rotates the ring gear 59, the driven gear 81 is rotated to rotate the first bevel gear 85 and the second bevel gear 86. The rotating motion of the second bevel gear 86 is transmitted to the intermediate gear 88 via the guide shaft 87, and then the gear 89 is rotated. As such, by the rotation mechanism 80, the guide body 65 is rotated about the rotational axis A. In this regard, when the moving body 61 moves in the radial direction, the guide shaft 87 passes through the through hole of the second bevel gear 86. Therefore, the movement of the moving body 61 is not obstructed.

The driven gears 81 of the nozzle units 53 mesh with the ring gear 59. Because of this, when the ring gear 59 is rotated, power is transmitted to the nozzle units 53 from the ring gear 59 at once. As a result, the guide bodies 65 of the nozzle units 53 are simultaneously rotated about the rotational axis A.

Details of Frame Member

Figure 7:
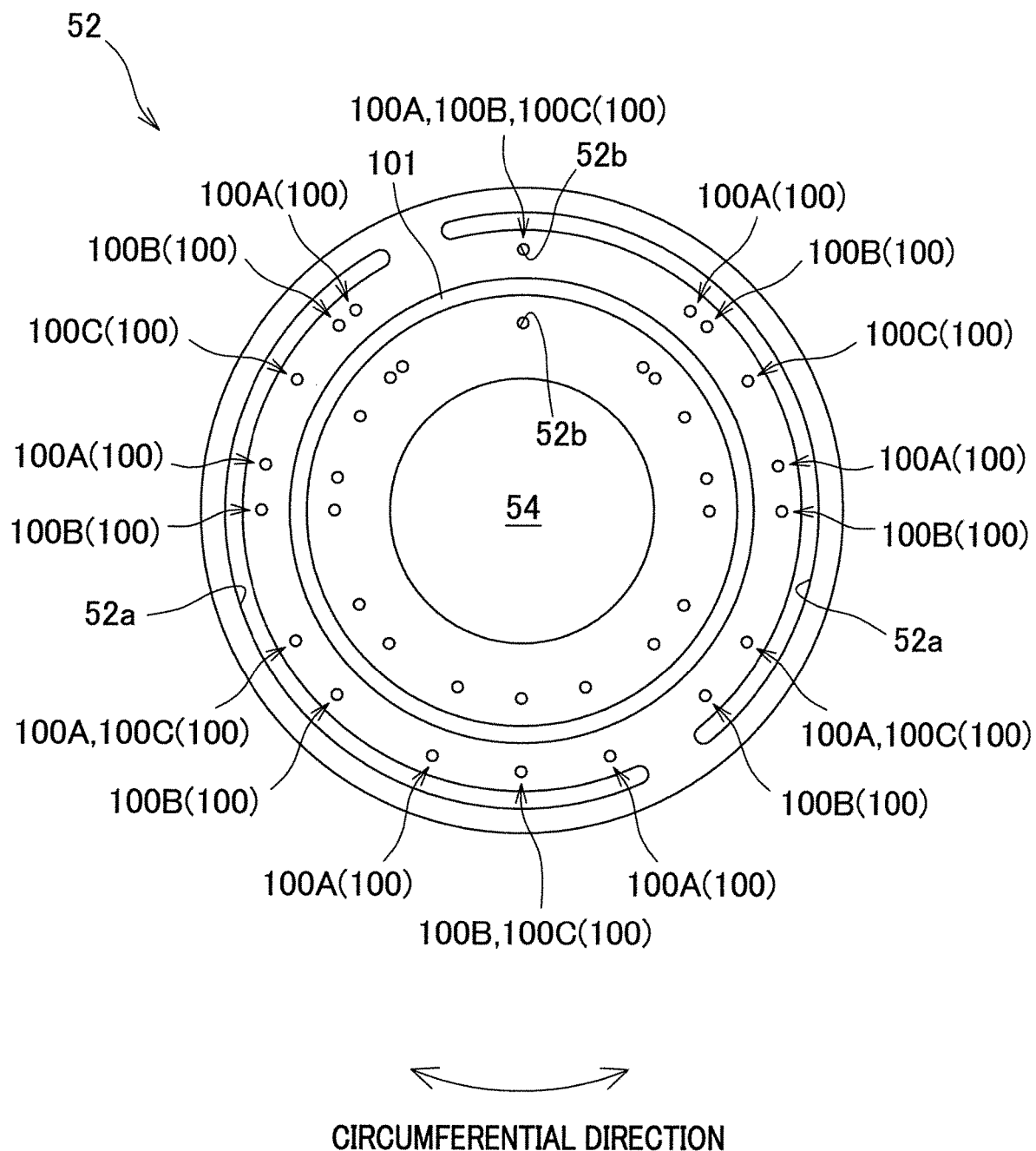
FIG. 7 is a front view of a frame member from which the nozzle units are detached.
Figure 8:
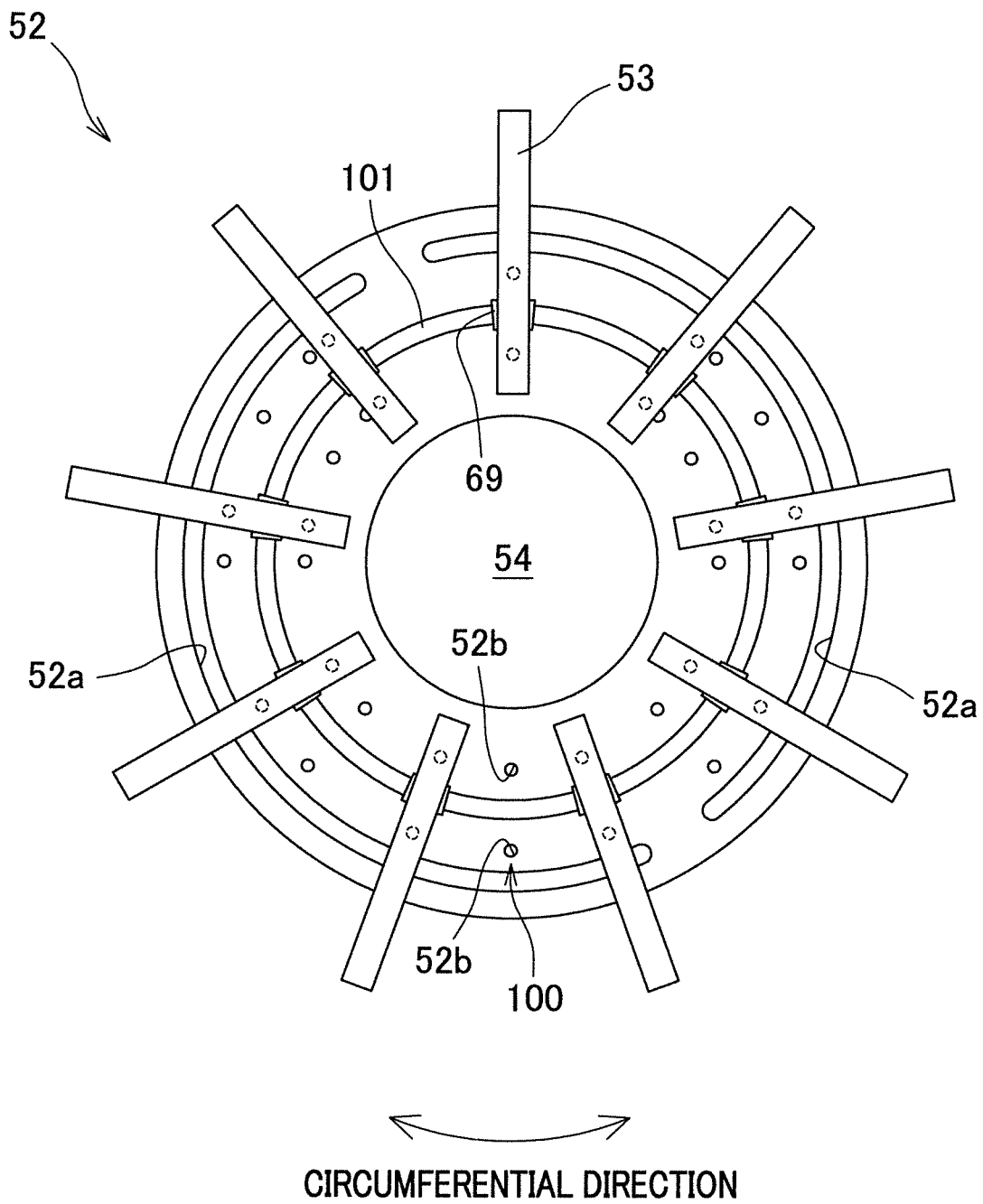
FIG. 8 is a front view of the frame member to which the nozzle units are attached.

FIG. 7 is a front view of the frame member 52 from which the nozzle units 53 are detached. FIG. 8 is a front view of the frame member 52 to which the nozzle units 53 are attached. As shown in FIG. 7, in the frame member 52, nozzle mounts 100 are provided in the circumferential direction. Each nozzle mount 100 includes two attachment holes 52b aligned in the radial direction. Each nozzle unit 53 is fixed to the frame member 52 by an unillustrated bolt inserted into the attachment hole 52b. In other words, the nozzle unit 53 is configured to be attachable to and detachable from the nozzle mount 100. The nozzle unit 53 is attached to the nozzle mount 100 so that the driven gear 71 meshes with the gear portion formed on the inner circumferential side of the ring gear 58 and the driven gear 81 meshes with the gear portion formed on the inner circumferential side of the ring gear 59.

The nozzle mounts 100 include nozzle mounts 100A, 100B, and 100C. The nozzle mounts 100A are provided in the circumferential direction at 40 degree intervals. The nozzle mounts 100B are provided in the circumferential direction at 45 degree intervals. The nozzle mounts 100C are provided in the circumferential direction at 60 degree intervals. Each groups of the nozzle mounts 100A, 100B, and 100C are provided at regular intervals from the 12 o'clock position which is the starting point. Some of the nozzle mounts 100A are partially shared by one group of or both groups of the nozzle mounts 100B and 100C. The same applies to the nozzle mounts 100B and 100C.

By attaching the nozzle units 53 to the nozzle mounts 100A, nine nozzle units 53 are provided as shown in FIG. 8 in the circumferential direction at regular intervals. Although not illustrated, by attaching the nozzle units 53 to the nozzle mounts 100B, eight nozzle units 53 are provided in the circumferential direction at regular intervals. In addition, by attaching the nozzle units 53 to the nozzle mounts 100C, six nozzle units 53 are provided in the circumferential direction at regular intervals. Furthermore, by suitably determining the nozzle mounts 100 to which the nozzle units 53 are attached, two, three, or four, which are divisors of six, eight, and nine, nozzle units 53 are attached in the circumferential direction at regular intervals.

The following will describe the structure in which mount positions of the nozzle units 53 are easily changeable. As described above, the through hole 52a is formed as shown in FIGS. 5 and 6 in the frame member 52 to allow the driven gear 71 of the nozzle unit 53 to pass through and reach the rear side of the frame member 52. In this example as shown in FIG. 7, through hole 52a is formed as a slot formed along the circumferential direction across two or more nozzle mounts 100. While in this example the number of the slots 52a is two, the number of the slots 52a may be changed. Because each through hole 52a is formed as a slot extending in the circumferential direction, each nozzle unit 53 is moved in the circumferential direction without pulling out the driven gear 71 from the through hole 52a. Because of this, the mount positions of the nozzle units 53 are easily changed.

On the front surface of the frame member 52, i.e., on the mount surface of the frame member 52 onto which the nozzle units 53 are attached, a guide portion 101 shaped to be annular along the circumferential direction is formed to protrude from the surface. Meanwhile, in the nozzle unit 53 (specifically, fixed portion 62 of the supporter 60), a guided portion 69 is provided to be engaged with the guide portion 101 as shown in FIG. 8. The nozzle unit 53 in which the guided portion 69 is engaged with the guide portion 101 is guided in the circumferential direction by the guide portion 101. Because of this, when the nozzle unit 53 is moved in the circumferential direction, the nozzle unit 53 is smoothly moved without pulling out the driven gear 71 from the through hole 52a.

Effects

In this example, because the nozzle mounts 100 to and from which the nozzle units 53 are attachable and detachable are provided in the frame member 52, the number of the nozzle units 53 is suitably changeable. In addition, each nozzle unit 53 is configured to be supplied with power via the ring gear 58 (equivalent to the endless toothed annular body for moving) and the ring gear 59 (equivalent to the endless toothed annular body for rotating) that are shared by the nozzle units 53. Because of this, when the number of the nozzle units 53 is changed, i.e., when the nozzle units 53 are attached to or detached from the nozzle mounts 100, it is unnecessary to attach or detach a power supply mechanism. Therefore, the number of the nozzle units 53 is easily changed, and thus the number of the supplied fiber bundles F is easily changed. It is therefore possible to easily deal with changes in diameter of a liner. The guide body 65 of each nozzle unit 53 is configured to guide the fiber bundles F to the liner L. Because of this, the fiber bundles F are simultaneously wound onto the liner L, and thus winding efficiency is increased. This auxiliarly brings about an effect of increasing the diameter of the guide body 65 guiding the fiber bundles F compared to a known guide body guiding only one fiber bundle F. Because of this, the rigidity of the guide body 65 is increased, and thus deformation (warping) of the guide body 65 due to the tension of the fiber bundles F is prevented.

In this example, the nozzle mounts 100 include at least the nozzle mounts 100A and the nozzle mounts 100B. The nozzle mounts 100A (equivalent to the first nozzle mounts) are provided at regular intervals of 40 degrees (equivalent to the first angle) in the circumferential direction. The nozzle mounts 100B (equivalent to the second nozzle mounts) are provided at regular intervals of 45, which is larger than 40 and not a multiple of 40, degrees (equivalent to the second angle). With this arrangement, the nozzle units 53 can be provided at regular intervals of at least 40 degrees or 45 degrees. Therefore, when the nozzle units 53 are provided at regular intervals, the degree of freedom in adjusting the number of the nozzle units 53 is increased. As a result, it is possible to support liners L with various diameters.

The nozzle mounts 100A and the nozzle mounts 100C may be interpreted as the first nozzle mounts and the second nozzle mounts, respectively. In this example, the first angle is 40 degree, and the second angle is 60 degree. Alternatively, the nozzle mounts 100B and the nozzle mounts 100C may also be interpreted as the first nozzle mounts and the second nozzle mounts, respectively. In this example, the first angle is 45 degree, and the second angle is 60 degree.

In this example, the nozzle mounts 100A (equivalent to the first nozzle mounts) are provided at 40 degree intervals in the circumferential direction, and the nozzle mounts 100B (equivalent to the second nozzle mounts) are provided at 45, which is larger than 40, degree intervals in the circumferential direction. With this arrangement, nine (=360/40) nozzle units 53 can be provided at regular intervals, and eight (=360/45) nozzle units 53 can be provided at regular intervals. Furthermore, two, three, and four, which are divisors of eight and nine, nozzle units 53 can be provided at regular intervals. Therefore, the degree of freedom in adjusting the number of the nozzle units 53 is high, and thus it is possible to correspond to various outer diameters of the liner L.

In this example, the endless toothed annular body (ring gear 58 for moving) and the endless toothed annular body (ring gear 59 for rotating) are equivalent to ring gears. The ring gears 58 and 59 are high in rigidity. Therefore, even if some nozzle units 53 which mesh with the ring gears 58 and 59 are detached, the shapes of the ring gears 58 and 59 are maintained to be substantially constant. Therefore, the transmission of power to the nozzle units 53 is stably performed.

In this example, the through hole 52a is formed in the frame member 52 to penetrate therethrough in the axial direction of the liner L. In addition, a part of the nozzle unit 53 attached to one side, in the axial direction, of the frame member 52 passes through the through hole 52a and extends to the other side of the frame member 52 so that the nozzle unit 53 is configured to receive power from the ring gear 58 provided on the other side of the frame member 52. In this regard, the through hole 52a is formed as a slot provided to cover the two or more nozzle mounts 100 along the circumferential direction. With this arrangement, even when a part of the nozzle unit 53 inserted into the slot 52a (through hole) is not pulled out from the slot 52a, the nozzle unit 53 is moved in the circumferential direction such that this part is moved in the slot 52a. Therefore, the mount position of each nozzle unit 53 is easily changed. In this regard, the number of the slots 52a is freely changed. When the number of the slots 52a is large, the connecting portions between the slots 52a which are adjacent to each other in the circumferential direction are increased. Therefore, the rigidity of the frame member 52 is increased. Meanwhile, when the number of the slots 52a is small, the number of times of detachments of the nozzle units 53 is decreased.

In this example, in the frame member 52, the guide portion 101 guiding the nozzle units 53 along the circumferential direction is provided. By providing the guide portion 101 configured as such, the nozzle units 53 are smoothly moved in the circumferential direction. Therefore, the mount positions of the nozzle units 53 are further easily changed.

Other Examples

The following will describe modifications of the above-described example.

In the example above, the ring gear 58 is provided behind the frame member 52, and the ring gear 59 is provided in front of the frame member 52. Alternatively, the ring gear 58 may be provided in front of the frame member 52 and the ring gear 59 may be provided behind the frame member 52.

While in the example above the diameter of the ring gear 58 and the diameter of the ring gear 59 are identical with each other, the diameter of the ring gear 58 and the diameter of the ring gear 59 may be different from each other.

While in the example above the ring gear 58 is rotationally driven by one motor 56, the ring gear 58 may be rotationally driven by plural motors. Similarly, while in the example above the ring gear 59 is rotationally driven by one motor 57, the ring gear 59 may be rotationally driven by plural motors.

In the example above, each nozzle mount 100 is formed of the attachment hole 52b into which a bolt is inserted for fixing each nozzle unit 53. However, the specific structure of the nozzle mount 100 is not limited. The nozzle mount 100 may be formed of, e.g., a suitable engagement mechanism. The position where the nozzle mount 100 is formed is suitably changeable in the circumferential direction.

In the example above, the nozzle mounts 100A provided at 40 degree intervals in the circumferential direction, the nozzle mounts 100B provided at 45 degree intervals in the circumferential direction, and the nozzle mounts 100C provided at 60 degree intervals in the circumferential direction are provided. However, the specific locations of the nozzle mounts 100 are not limited. For example, the nozzle mounts 100 may be provided at 72 degree intervals in the circumferential direction. When the nozzle mounts 100 provided at 72 degree intervals are added to the nozzle mounts 100 provided at 40, 45, and 60 intervals, two, three, four, five, six, eight, and nine nozzle units 53 can be provided at regular intervals in the circumferential direction. Alternatively, the nozzle mounts 100 may be provided at intervals of less than 40 degrees. For example, when the nozzle mounts 100 are provided at 30 degree intervals, twelve nozzle units 53 are provided at regular intervals in the circumferential direction. Furthermore, when the nozzle mounts 100 are provided at 24 degree intervals, fifteen nozzle units 53 are provided at regular intervals in the circumferential direction.

While in the example above the nozzle units 53 are provided at regular intervals in the circumferential direction, the nozzle units 53 may not be provided at regular intervals. For example, the nozzle units 53 may be provided at different intervals. Alternatively, only one nozzle unit 53 may be attached to the frame member 52.

In the example above, the through hole 52a formed in the frame member 52 is a slot extending in the circumferential direction. In this regard, the through hole 52a may not be a slot. For example, a through hole 52a larger than the driven gear 71 of each nozzle unit 53 may be formed to correspond to each nozzle mount 100. In this example, when the mount position of the nozzle unit 53 is changed, it is necessary to pull out the driven gear 71 from the through hole 52a. However, the rigidity of the frame member 52 is advantageously increased.

In the example above, the guide portion 101 which is annular in shape is provided in the frame member 52. However, the guide portion 101 is not necessarily annular in shape, and may be circular-arc-shaped. It is not essential to provide the guide portion 101.

In the example above, each of the endless toothed annular body for moving and the endless toothed annular body for rotating (hereinafter, collectively the endless toothed annular bodies) is formed of a ring gear. Alternatively, instead of a ring gear, each of the endless toothed annular bodies may be formed of, e.g., an endless belt.

Figure 9:
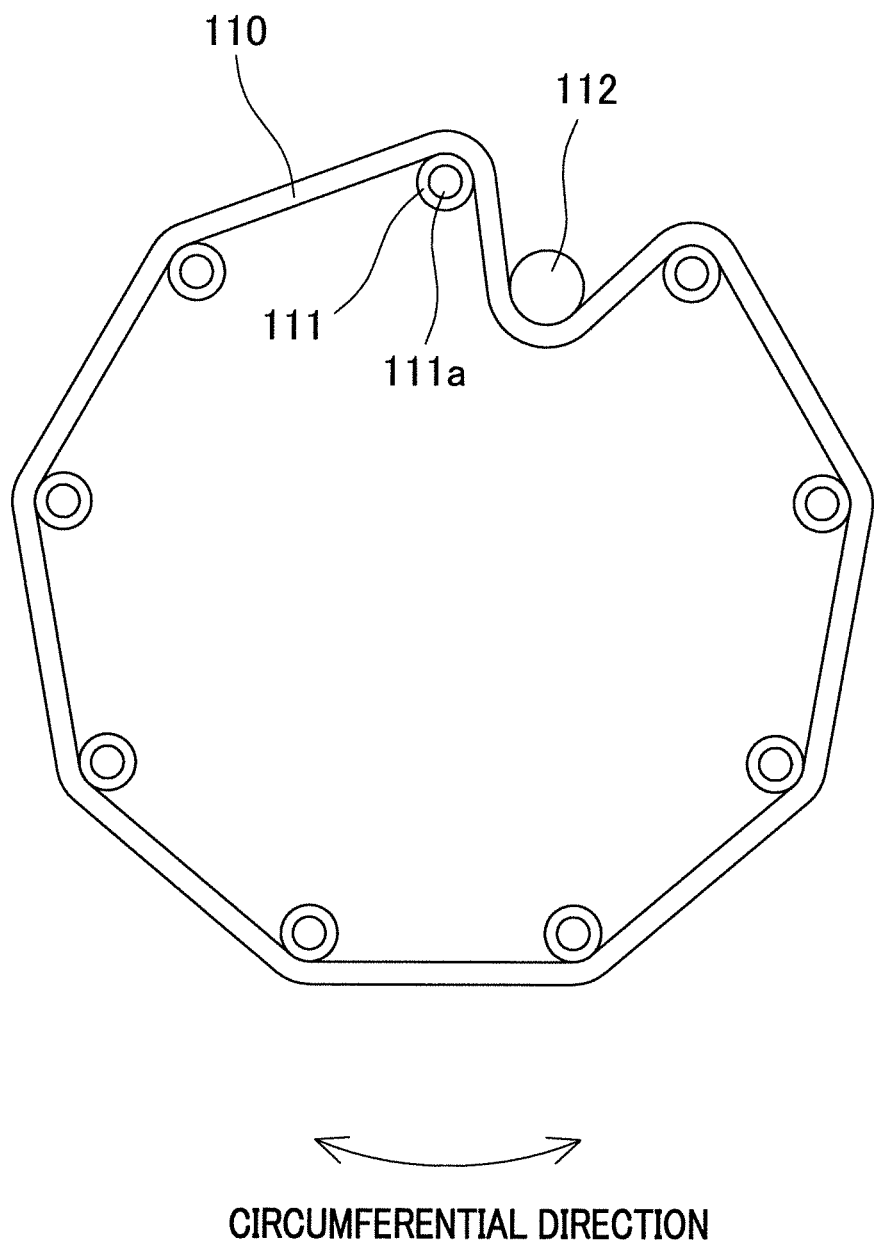
FIG. 9 is a schematic diagram in which an endless belt is used as an endless toothed annular body.

FIG. 9 is a schematic diagram in which an endless belt is used as each of the endless toothed annular bodies. In FIG. 9, the frame member 52 and the nozzle units 53 and the like are omitted from the figure. An endless belt 110 is wound onto driven pulleys 111 and one driving pulley 112. Each driven pulley 111 is provided at a position corresponding to each nozzle mount 100 (nozzle mount 100A in this example). With the driven pulley 111, a stepped gear 111a is integrally formed. Each nozzle unit 53 is attached to the frame member 52 so that the driven gear 71 (or driven gear 81) meshes with the stepped gear 111a. By being rotationally driven by an unillustrated driving motor, the driving pulley 112 rotates the endless belt 110 in the circumferential direction.

As the driving pulley 112 rotates the endless belt 110, the stepped gear 111a of each driven pulley 111 is rotated. Subsequently, power is transmitted from the stepped gear 111a to the driven gear 71 (or driven gear 81) so that the guide body 65 is moved (or rotated about the rotational axis A) in the radial direction. By using the endless belt 110, the endless belt 110 is easily replaced even when the endless belt 110 is worn. In this regard, the shape of the endless belt 110 is maintained to be constant by the driven pulleys 111 provided on the inner circumferential side of the endless belt 110. Because of this, when the nozzle units 53 are attached or detached, the endless belt 110 does not slacken. Therefore, power is properly transmitted.

The invention claimed is:

1. A filament winding device comprising a helical winding unit configured to helical-wind at least one fiber bundle onto a liner,
the helical winding unit including:
a frame member in which nozzle mounts are aligned in a circumferential direction centered at an axis of the liner;
at least one nozzle unit including a guide body that is attachable to and detachable from at least one of the nozzle mounts, the guide body being movable in a radial direction of the liner, rotatable about a rotational axis extending in the radial direction, and capable of guiding a plurality of fiber bundles to the liner;
an endless toothed annular body for moving, formed in an annular shape along the circumferential direction and configured to transmit power to all of the at least one nozzle unit attached to the at least one of the nozzle mounts, the power provided to move the guide body in the radial direction; and
an endless toothed annular body for rotating, formed in an annular shape along the circumferential direction and configured to transmit power to all of the at least one nozzle unit attached to the at least one of the nozzle mounts, the power provided to rotate the guide body about the rotational axis.

2. The filament winding device according to claim 1, wherein the nozzle mounts include at least first nozzle mounts regularly provided at first angle intervals in the circumferential direction and at least second nozzle mounts regularly provided at second angle intervals in the circumferential direction, the second angle being larger than the first angle and not a multiple of the first angle.

3. The filament winding device according to claim 2, wherein the first nozzle mounts are provided at 40 degree intervals in the circumferential direction, and the second nozzle mounts are provided at larger degree intervals than the 40 degree intervals in the circumferential direction.

4. The filament winding device according to claim 1, wherein the endless toothed annular body for moving and the endless toothed annular body for rotating are ring gears.

5. The filament winding device according to claim 1, wherein the endless toothed annular body for moving and the endless toothed annular body for rotating are endless belts, and the endless belts are wound onto pulleys each of which is able to transmit power from the endless belts to the at least one nozzle unit.

6. The filament winding device according to claim 1, wherein a through hole is formed in the frame member to penetrate the frame member in an axial direction of the liner,
a part of the at least one nozzle unit attached to one side, in the axial direction, of the frame member passes through the through hole and reaches the other side of the frame member so that the at least one nozzle unit is able to receive power from one of the endless toothed annular body for moving and the endless toothed annular body for rotating which is provided on the other side of the frame member, and
the through hole is a slot formed across two or more of the nozzle mounts along the circumferential direction.

7. The filament winding device according to claim 6, wherein a guide portion configured to guide the at least one nozzle unit along the circumferential direction is provided in the frame member.

8. The filament winding device according to claim 2, wherein the endless toothed annular body for moving and the endless toothed annular body for rotating are ring gears.

9. The filament winding device according to claim 3, wherein the endless toothed annular body for moving and the endless toothed annular body for rotating are ring gears.

10. The filament winding device according to claim 2, wherein the endless toothed annular body for moving and the endless toothed annular body for rotating are endless belts, and the endless belts are wound onto pulleys each of which is able to transmit power from the endless belts to the at least one nozzle unit.

11. The filament winding device according to claim 3, wherein the endless toothed annular body for moving and the endless toothed annular body for rotating are endless belts, and the endless belts are wound onto pulleys each of which is able to transmit power from the endless belts to the at least one nozzle unit.

12. The filament winding device according to claim 2, wherein a through hole is formed in the frame member to penetrate the frame member in an axial direction of the liner,
a part of the at least one nozzle unit attached to one side, in the axial direction, of the frame member passes through the through hole and reaches the other side of the frame member so that the at least one nozzle unit is able to receive power from one of the endless toothed annular body for moving and the endless toothed annular body for rotating which is provided on the other side of the frame member, and
the through hole is a slot formed across two or more of the nozzle mounts along the circumferential direction.

13. The filament winding device according to claim 3, wherein a through hole is formed in the frame member to penetrate the frame member in an axial direction of the liner,
a part of the at least one nozzle unit attached to one side, in the axial direction, of the frame member passes through the through hole and reaches the other side of the frame member so that the at least one nozzle unit is able to receive power from one of the endless toothed annular body for moving and the endless toothed annular body for rotating which is provided on the other side of the frame member, and
the through hole is a slot formed across two or more of the nozzle mounts along the circumferential direction.

14. The filament winding device according to claim 4, wherein a through hole is formed in the frame member to penetrate the frame member in an axial direction of the liner,
a part of the at least one nozzle unit attached to one side, in the axial direction, of the frame member passes through the through hole and reaches the other side of the frame member so that the at least one nozzle unit is able to receive power from one of the endless toothed annular body for moving and the endless toothed annular body for rotating which is provided on the other side of the frame member, and the through hole is a slot formed across two or more of the nozzle mounts along the circumferential direction.

15. The filament winding device according to claim 5, wherein a through hole is formed in the frame member to penetrate the frame member in an axial direction of the liner, a part of the at least one nozzle unit attached to one side, in the axial direction, of the frame member passes through the through hole and reaches the other side of the frame member so that the at least one nozzle unit is able to receive power from one of the endless toothed annular body for moving and the endless toothed annular body for rotating which is provided on the other side of the frame member, and the through hole is a slot formed across two or more of the nozzle mounts along the circumferential direction.

* * * * *